Patented Apr. 5, 1949

2,466,008

UNITED STATES PATENT OFFICE 2,466,008

ANTHRAQUINONE COMPOUNDS CONTAINING A 2,2,2 - TRIFLUOROETHYLAMINO GROUP

Joseph B. Dickey, Rochester, N. Y., assignor to Eastman Kodak Company, Rochester, N. Y., a corporation of New Jersey No Drawing. Application March 26, 1946, Serial No. 657,345

1 Claim. (Cl. 260—380)

This invention relates to new anthraquinone compounds and their application to the art of dyeing or coloring.

The anthraquinone compounds of my invention can be represented by the general formula:

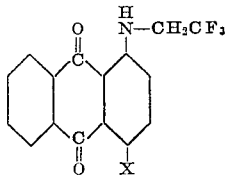

wherein X stands for a member selected from the group consisting of a hydrogen atom, a bromine atom, a chlorine atom, a hydroxy group, an amino group, a 2,2-difluoroethylamino group, a 2,2,2-trifluoroethylamino group, an alkylamino group containing 1 to 6, inclusive, carbon atoms, an alkoxyalkylamino group containing 3 to 8, inclusive, carbon atoms and wherein the oxygen linkage is joined to a carbon atom, other than an α-carbon atom, of the grouping immediately preceding it, a hydroxyalkylamino group containing 2 to 5, inclusive, carbon atoms and wherein there is no hydroxy group on the carbon atom which is attached to the nitrogen atom, and a monohydroxyalkoxyalkylamino group containing 4 to 9, inclusive, carbon atoms wherein the hydroxy group is attached to a carbon atom, other than an α-carbon atom, of the alkoxy group furthest removed from the amino group, wherein the —OC$_n$H$_{2n}$— and —C$_n$H$_{2n}$— groupings present in the monohydroxyalkoxyalkylamino group contain at least two but no more than three carbon atoms and wherein the oxygen linkage present is joined to a carbon atom, other than an α-carbon atom, of the grouping immediately preceding it.

It is an object of my invention to provide new anthraquinone compounds. Another object is to provide a satisfactory process for preparing the new anthraquinone compounds of the invention. A further object is to provide colored materials of good fastness properties. A specific object is to provide colored cellulose acetate textile materials of good fastness properties. A still further object is to provide a satisfactory process for coloring nylon and organic derivatives of cellulose textile materials with the new anthraquinone compounds of the invention.

The new anthraquinone compounds of my invention constitute valuable dyes for the coloration of organic derivatives of cellulose and nylon materials, especially textile materials made of these materials. They are particularly adapted for the coloration of cellulose acetate textile materials. They possess good affinity for the aforesaid textile materials, are readily applied thereto, and yield dyeings thereon which are of superior gas and light fastness properties. In some instances dyeings are obtained, for example, on cellulose acetate textile materials, which possess exceptional gas and light fastness properties. To illustrate, 1-2,2,2-trifluoroethylamino-4-hydroxyanthraquinone when applied directly to a 100% cellulose acetate textile material from an aqueous suspension of the dye gave a reddish-pink dyeing which, so far as we are aware, is at least twice as fast to light as any dyeing obtained with a dye of comparable color applied directly to cellulose acetate from a water bath. The dyeing obtained was also very stable to gas fading.

Orange, reddish-pink, reddish-violet, violet and reddish-blue dyeings are obtained with the 2,2,2-trifluoroethylaminoanthraquinone compounds of my invention. The dyeings obtained are more reddish than those obtained with the corresponding anthraquinone compounds containing the ethylamino group instead of the 2,2,2-trifluoroethylamino group. Thus while 1-hydroxy-4-2,2,2-trifluoroethylaminoanthraquinone dyes cellulose acetate a reddish-pink color (about the same as that obtained with 1-hydroxy-4-aminoanthraquinone) 1-hydroxy-4-ethylaminoanthraquinone dyes cellulose acetate a bluish-violet color. Further the dyeing obtained on cellulose acetate with a .25% by weight of a ⅓ dye mixture of 1-hydroxy-4-2,2,2-trifluoroethylaminoanthraquinone showed little fading after a 120 hour light fastness test (American Association of Textile Chemists and Colorists) and very little fading to gas even after 3 times the normal AATCC test whereas a similar dyeing on cellulose acetate with 1-hydroxy-4 - ethylaminoanthraquinone shows considerable fading after a 24 hour light fastness test and considerable fading to gas after the AATCC test for gas fastness.

Illustrative alkylamino groups include, for example the methylamino group, the ethylamino group, the n-propylamino group, the isopropylamino group, the n-butylamino group, the n-amylamino group and the n-hexylamino group. Illustrative alkoxyalkylamino groups include, for example, the β-methoxyethyl-amino group, the β-ethoxyethylamino group, the β-(n-propoxy)-ethylamino group, the β-(n-butoxy)-ethylamino group, the γ-methoxy-(n-propyl)-amino group, the β-(β-methoxyethoxy)-ethylamino group $$[-\overset{H}{N}-CH_2CH_2OCH_2CH_2OCH_3]$$

the β-(β-ethoxyethoxy)-ethylamino group, the β[β - (β - methoxyethoxy) - ethoxy] - ethylamino group

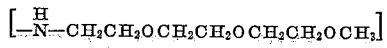

the β[β-(β-ethoxyethoxy)-ethoxy]-ethylamino group

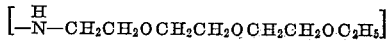

the β-(β-n-butoxyethoxy)-ethylamino group

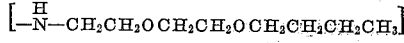

the γ-(γ-methoxypropoxy)-propylamino group

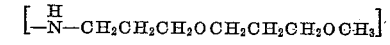

and the β-(β-ethoxypropoxy)-propylamino group

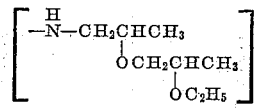

Illustrative of the hydroxyalkylamino groups that can be present in the anthraquinone compounds of my invention may be mentioned, for example, the β-hydroxyethylamino group, the β-hydroxypropylamino group, the γ-hydroxypropylamino group, the 4-hydroxybutylamino group, the 5-hydroxyamylamino group, the β-γ-dihydroxypropylamino group, the 1-methylolethylamino group

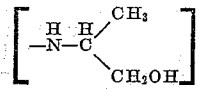

the 1-methylol-n-propylamino group

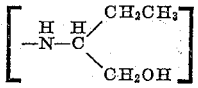

the 3-methylol-2-butylamino group

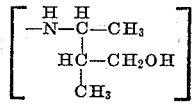

the 3-hydroxy-2-butylamino group

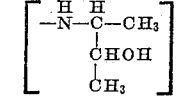

the dimethylolmethylamino group

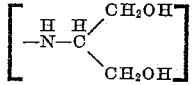

the 1,1-dimethylolethylamino group

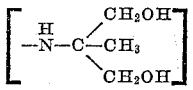

the 1,1-dimethylol-n-propylamino group

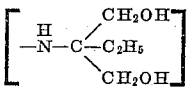

the trimethylolmethylamino group

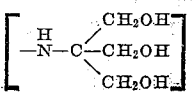

the 2-methylol-2-butylamino group

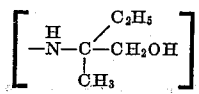

and the 2-ethylol-2-propylamino group

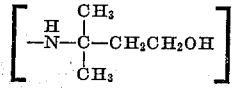

β-(β-hydroxyethoxy)-ethylamino

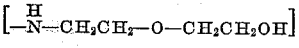

β-[β-(β-hydroxyethoxy)-ethoxy]-ethylamino

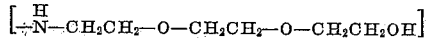

γ-(γ-hydroxypropoxy)-propylamino

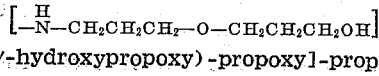

γ-[γ-(γ-hydroxypropoxy)-propoxy]-propylamino

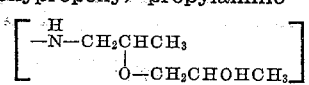

β-(β-hydroxypropoxy)-propylamino

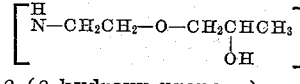

β-(β-hydroxypropyl)-ethylamino

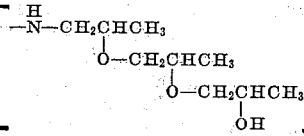

and β - [β-(β-hydroxy-propoxy)-propoxy]-propylamino are illustrative of the monohydroxyalkoxyalkylamino groups that can be present in the anthraquinone compounds of my invention.

The compounds of my invention can be prepared in a variety of ways. 1-2,2,2-trifluoroethylaminoanthraquinone can be prepared, for example, by reacting 1-nitroanthraquinone with 2,2,2-trifluoroethylamine in the presence of an inert solvent such as dry pyridine, ethanol or n-butanol. 1-2,2,2-trifluoroethylamino-4-aminoanthraquinone can be prepared, for example, by reacting 1-amino-4-nitroanthraquinone with 2,2,2-trifluoroethylamine in the presence of pyridine. 1 - 2,2,2 - trifluoroethylamino - 4 - bromoanthraquinone can be prepared, for example, by reacting bromine (10% excess) with 1-2,2,2-trifluoroethylaminoanthraquinone in the presence of an inert diluent or solvent such as pyridine, ethanol or n-butanol. The use of pyridine is advantageous. 1-2,2,2 - trifluoroethylamino - 4-chloroanthraquinone can be prepared in a similar manner by reacting chlorine with 1-2,2,2-trifluoroethylaminoanthraquinone. The chlorination reaction can also be carried out with sulfuryl chloride and a catalyst such as ferric chloride in an inert diluent medium such as pyridine.

1-2,2,2 - trifluoroethylamino-4-hydroxyanthraquinone can be prepared by reacting leuco quinizarin or a mixture of quinizarin and leuco quinizarin with a slight excess of 2,2,2-trifluoroethylamine over that theoretically required to replace one of the hydroxy groups.

Compounds wherein an alkylamino, alkoxyalkylamino, a hydroxyalkylamino or a monohydroxyalkoxyalkylamino group is present in the 4-position can be prepared by reacting the leuco form of 1-2,2,2-trifluoroethylamino-4-hydroxyanthraquinone with an alkylamine, an alkoxyalkylamine, a hydroxyalkylamine and a monohydroxyalkoxyalkylamine, respectively. These compounds can also be prepared by reacting a leuco 1-(alkyl, hydroxyalkyl, alkoxyalkyl or hydroxyalkoxyalkyl) - amino - 4 - hydroxyanthraquinone with 2,2,2-trifluoroethylamine. Also mixtures of dyes can be prepared by reacting leuco quinizarin or a mixture of leuco quinizarin and quinizarin with 2,2,2-trifluoroethylamine and one or more amines selected from the group consisting of an alkylamine, an alkoxyalkylamine, a hydroxyalkylamine and a hydroxyalkoxyalkylamine. Where the leuco form of the dye compound is obtained, the leuco dye compound is oxidized to its non-leuco form by treatment with an oxidizing agent such as air, oxygen, sodium perborate, nitrobenzene, hydrogen peroxide or ammonium persulfate, for example. Normally, the condensation reactions referred to in this paragraph are carried out in the presence of an inert diluent, which may also act as a solvent, such as water, pyridine, ethanol, n-propanol and n-butanol.

Anthraquinone compounds containing a 2,2,2-trifluoroethylamino group in both the 1 and 4 positions can be prepared by methods similar to those described above. Thus 1,4-di-2,2,2-trifluoroethylaminoanthraquinone can be prepared by reacting two molecular equivalent weights of 2,2,2-trifluoroethylamine with 1 molecular equivalent weight of leuco quinizarin or an equivalent amount of a mixture of quinizarin and leuco quinizarin. Any unoxidized dye compound present in the reaction mixture is oxidized to its non-leuco form. 1 - 2,2,2-trifluoroethylamino-4-2,2-difluoroethylaminoanthraquinone can be prepared, for example, by reacting leuco 1-2,2,2-trifluoroethylamino - 4 - hydroxyanthraquinone with 2,2-difluoroethylamine and oxidizing the resulting leuco compound formed to its non-leuco form. Sodium perborate or any of the other oxidizing agents indicated herein can be used for the oxidation.

In those cases where a mixture of quinizarin and leuco quinizarin is used, at least 10% by weight of leuco quinizarin should be present in the mixture.

The following examples in which parts are by weight further illustrate the compounds of my invention and their manner of preparation.

Example 1

2.42 parts of leuco quinizarin, 1.09 parts of 2,2,2-trifluoroethylamine and 12.2 parts of n-butyl alcohol were placed in a suitable reaction vessel, heated over a hot plate for 14 hours at just under refluxing conditions, and then heated at refluxing conditions for 6 hours. The leuco dye formed was oxidized by adding 3 parts of water and 2.31 parts of sodium perborate (NaBO$_3$·4H$_2$O) to the reaction mixture and heating for three hours. The reaction mixture was then poured into 500 parts of hot water, with stirring and stirring was continued until the reaction mixture was cold, following which the reaction mixture was filtered. The precipitate obtained was washed well with water and dried. A good yield of 1-2,2,2-trifluoroethylamino - 4 - hydroxyanthraquinone was obtained. Upon crystallization from ethyl alcohol, the product melted at 143–145° C. It gave a wine-red color in acetone and dyed cellulose acetate a reddish-pink color which was exceptionally light-fast and very stable to gas fading. It dyes nylon a similar color.

An analysis of the product for nitrogen showed the following:

| Theoretical | Found |
|---|---|
| Percent 4.36 | Percent 4.08 |

Example 2

2.42 parts of leuco quinizarin, 2.48 parts of 2,2,2-trifluoroethylamine and 8.1 parts of n-butanol were placed in a sealed glass tube and heated in a shaking autoclave at 105–120° C. for 12 hours. The wine-red reaction mixture was cooled and removed from the glass tube with the aid of some n-butanol following which the reaction product was oxidized by refluxing gently with 5 parts of water and 2.31 parts of sodium perborate for 3 hours. The reaction mixture became somewhat more violet colored upon oxidation. Upon completion of the oxidation reaction, the reaction mixture was cooled and the crystallized product was recovered by filtration. 1.7 parts of 1,4-di-2,2,2-trifluoroethylaminoanthraquinone were obtained. Upon evaporation of the filtrate, an additional 0.75 part of the product was obtained. The 2.45 parts of crude product thus obtained were recrystallized from n-butanol to obtain a purified product having a melting point of 200–205° C. which gave a violet-pink color in acetone and which dyed cellulose acetate the same color. The dyeing obtained was very fast to light and gas. It dyes nylon a similar color.

Example 3

10 parts of 1-nitroanthraquinone in 100 parts of dry pyridine are heated to 100° C. and 5 parts of 2,2,2-trifluoroethylamine are added dropwise. A reddish color indicating reaction develops at once and after a short period of heating, preferably with stirring, the reaction is complete. 1-2,2,2-trifluoroethylaminoanthraquinone crystallizes out of the pyridine on cooling and is recovered by filtration. It can be further purified by recrystallization from a solvent such as pyridine, toluene or acetic acid. The dye compound obtained as described dyes cellulose acetate and nylon orange shades. This compound can also be prepared by substituting an equivalent gram molecular weight of 1-chloroanthraquinone or sodium anthraquinone-1-sulfonate for 1-nitroanthraquinone in the foregoing reaction.

Example 4

13.4 parts of 1-amino-4-nitroanthraquinone are dissolved in 148 parts of dry pyridine and heated on a steam bath. 7 parts of 2,2,2-trifluoroethylamine in 250 parts of dry pyridine are then added dropwise with stirring while heating on the steam bath. The reaction mixture immediately turns to a reddish-violet color. When no further color change takes place, the reaction mixture is allowed to cool and 1-2,2,2-trifluoroethylamino-4-aminoanthraquinone crystallizes out and is recovered by filtration. The dye compound thus obtained can be purified by recrystallization from a solvent such as pyridine, toluene or acetic acid. It colors cellulose acetate and nylon textile materials violet shades.

Example 5

12 parts of leuco quinizarin are dissolved in 122 parts of n-butyl alcohol and 5 parts of 2,2,2-trifluoroethylamine in 16.2 parts of n-butyl alcohol are added dropwise to the reaction mixture which is maintained under refluxing conditions. Then 4.5 parts of 2,2-difluoroethylamine in 16.2 parts of n-butyl alcohol are added dropwise while maintaining the reaction mixture under refluxing conditions. Refluxing is continued for an additional ten hours following which the leuco dye compound formed is oxidized to its non-leuco form by passing air into the reaction mixture. Upon cooling 1-2,2,2-trifluoroethylamino-4-2,2-difluoroethylaminoanthraquinone precipitates out of the n-butyl alcohol and is recovered by filtration and washed well with water. The dye compound obtained is purified by crystallization from pyridine. It colors cellulose acetate and nylon textile materials violet shades which possess good fastness to light and gas.

*Example 6*

12 parts of leuco quinizarin are dissolved in 122 parts of n-butyl alcohol and 1.6 parts of methylamine as a 25% water solution are added dropwise under refluxing conditions. Then 5.5 parts of 2,2,2-trifluoroethylamine in 16.2 parts of n-butyl alcohol are added dropwise while maintaining the reaction mixture under refluxing conditions. Refluxing is continued for an additional 10 hours following which the leuco dye compound formed is obtained by passing air into the reaction mixture. If desired, sodium perborate can be used to effect the oxidation. 1-2,2,2-trifluoroethylamino-4-methylaminoanthraquinone separates from the reaction mixture and is recovered by filtration. It can be purified by crystallization from a solvent such as pyridine or n-butyl alcohol. It colors cellulose acetate and nylon textile materials reddish-blue shades which are of good fastness to light and gas.

By the substitution of an equivalent molecular weight of ethylamine for methylamine in the foregoing example, 1-2,2,2-trifluoroethylamino-4-ethylaminoanthraquinone is obtained. This dye compound similarly colors cellulose acetate and nylon textile materials reddish-blue shades which are of good fastness to light and gas.

*Example 7*

12 parts of leuco quinizarin are dissolved in 122 parts of n-butyl alcohol and 5 parts of 2,2,2-trifluoroethylamine are added thereto and the reaction mixture is heated to refluxing conditions. When no further color change takes place, 3.5 parts of ethanolamine are added dropwise with stirring to the reaction mixture which is maintained under refluxing conditions. The reaction mixture is refluxed, with stirring, for an additional 10 hours and then the leuco dye compound formed is oxidized by passing in air, or if desired, the oxidation can be effected with sodium perborate. 1-2,2,2-trifluoroethylamino-4-β-hydroxyethylaminoanthraquinone precipitates from the reaction mixture upon cooling and is recovered by filtration. It is purified by recrystallization from pyridine. It colors cellulose acetate and nylon textile materials reddish-blue shades which are of good fastness to light and gas.

*Example 8*

12 parts of leuco quinizarin are dissolved in 122 parts of n-butyl alcohol and 5 parts of 2,2,2-trifluoroethylamine in 16.2 parts of n-butyl alcohol are added dropwise under refluxing conditions. Then 8 parts of β-methoxyethylamine in 16.2 parts of n-butyl alcohol are added dropwise with stirring to the reaction mixture which is maintained under refluxing conditions. Refluxing is continued for an additional 10 hours. The leuco dye compound formed is oxidized and the 1-2,2,2-trifluoroethylamino-4-β-methoxyethylaminoanthraquinone which precipitates from the reaction mixture is recovered by filtration, washed with water and dried. It is purified by recrystallization from pyridine. It colors cellulose acetate and nylon textile materials reddish-blue shades which are of good fastness to light and gas. The oxidation reaction referred to above can be carried out by passing air into the reaction mixture or by means of the oxidizing agents specifically mentioned hereinbefore or by any other suitable oxidizing agent.

*Example 9*

12 parts of leuco quinizarin are dissolved in 122 parts of n-butyl alcohol and 5 parts of 2,2,2-trifluoroethylamine in 16.2 parts of n-butyl alcohol are added dropwise under refluxing conditions. Then 4.5 parts of β-(β-hydroxyethoxy)-ethylamine in 16.2 parts of n-butyl alcohol are added dropwise with stirring to the reaction mixture which is maintained under refluxing conditions. Refluxing is continued for an additional ten hours. The leuco dye compound formed is then oxidized by means of sodium perborate and the 1-2,2,2-trifluoroethylamino-4-β-(β-hydroxyethoxy)-ethylaminoanthraquinone which precipitates from the reaction mixture is recovered by filtration, washed with water and dried. It is purified by recrystallization from pyridine. It colors cellulose acetate and nylon textile materials reddish-blue shades which are of good fastness to light and gas.

*Example 10*

6 parts of leuco quinizarin, 6 parts of quinizarin, 4 parts of ethylamine and 6 parts of 2,2,2-trifluoroethylamine are reacted in 122 parts of n-butyl alcohol at 100° C. with stirring for 15 hours. The reaction mixture is worked up in accordance with the procedure described in Example 9. An intimate mixture of 1,4-diethylaminoanthraquinone, 1,4-di-2,2,2-trifluoroethylaminoanthraquinone and 1-2,2,2-trifluoroethylamino-4-ethylaminoanthraquinone is obtained.

Frequently, dye mixtures having improved dyeing characteristics can be obtained in the manner just indicated. As is apparent, a wide variety of amines can be used. Thus mixtures of methylamine and 2,2,2-trifluoroethylamine; n-propylamine and 2,2,2-trifluoroethylamine; ethanolamine and 2,2,2-trifluoroethylamine; β-ethoxyethylamine and 2,2,2-trifluoroethylamine, methylamine, ethylamine and 2,2,2-trifluoroethylamine and 2,2-difluoroethylamine and 2,2,2-trifluoroethylamine, for example, can be employed.

*Example 11*

61 parts of 1-2,2,2-trifluoroethylaminoanthraquinone are dissolved in 590 parts of pyridine and heated on a water bath to 60° C. while stirring. Then while maintaining this temperature, 33.2 parts of bromine are added to the reaction mixture over a 1½ hour period. The reaction mixture is then slowly heated to 90–95° C., maintained at this temperature for two hours and the 1-2,2,2-trifluoroethylamino-4-bromoanthraquinone which is formed is recovered by filtration, washed with 100 parts of pyridine and dried. The dye compound thus obtained colors cellulose acetate and nylon textile materials orange shades.

The following compounds further illustrate the compounds included within the scope of my invention. They can be prepared by the methods described hereinbefore.

1-2, 2, 2-trifluoroethylamino-4-chloroanthraquinone
1-2, 2, 2-trifluoroethylamino-4-n-propylaminoanthraquinone
1-2, 2, 2-trifluoroethylamino-4-isopropylaminoanthraquinone
1-2, 2, 2-trifluoroethylamino-4-n-butylaminoanthraquinone
1-2, 2, 2-trifluoroethylamino-4-n-amylaminoanthraquinone
1-2, 2, 2-trifluoroethylamino-4-n-hexylaminoanthraquinone
1-2, 2, 2-trifluoroethylamino-4-β-hydroxypropylamino-anthraquinone
1-2, 2, 2-trifluoroethylamino-4-γ-hydroxypropylamino-anthraquinone
1-2, 2, 2-trifluoroethylamino-4-ω-hydroxyamylamino-anthraquinone
1-2, 2, 2-trifluoroethylamino-4-β, γ-dihydroxypropylaminoanthraquinone
1-2, 2, 2-trifluoroethylamino-4-(1-methylolethyl)-aminoanthraquinone
1-2, 2, 2-trifluoroethylamino-4-dimethylolmethylaminoanthraquinone
1-2, 2, 2-trifluoroethylamino-4-trimethylolmethylaminoanthraquinone
1-2, 2, 2-trifluoroethylamino-4-(3-methylol-2-butyl)-aminoanthraquinone
1-2, 2, 2-trifluoroethylamino-4-(1, 1-dimethylolethyl)-aminoanthraquinone
1-2, 2, 2-trifluoroethylamino-4-(1, 1-dimethylol-n-propyl)-aminoanthraquinone
1-2, 2, 2-trifluoroethylamino-4-(1-methylol-n-propyl)-aminoanthraquinone
1-2, 2, 2-trifluoroethylamino-4-(3-hydroxy-2-butyl)-aminoanthraquinone
1-2, 2, 2-trifluoroethylamino-4-(2-methylol-2-butyl)-aminoanthraquinone
1-2, 2, 2-trifluoroethylamino-4-(2-ethylol-2-propyl)-aminoanthraquinone
1-2, 2, 2-trifluoroethylamino-4-β-ethoxyethylaminoanthraquinone
1-2, 2, 2-trifluoroethylamino-4-β-(n-propoxyethyl)-aminoanthraquinone
1-2, 2, 2-trifluoroethylamino-4-γ-methoxy-(n-propyl)-aminoanthraquinone
1-2, 2, 2-trifluoroethylamino-4-β-(β-methoxyethoxy)-ethylaminoanthraquinone
1-2, 2, 2-trifluoroethylamino-4-β-[β-(β-ethoxyethoxy)-ethoxy]-ethylaminoanthraquinone
1-2, 2, 2-trifluoroethylamino-4-β-(β-n-butoxyethoxy)-ethylaminoanthraquinone
1-2, 2, 2-trifluoroethylamino-4-γ-(γ-methoxypropoxy)-propylaminoanthraquinone
1-2, 2, 2-trifluoroethylamino-4-β-(β-ethoxypropoxy)-propylaminoanthraquinone
1-2, 2, 2-trifluoroethylamino-4-β-[β-(β-hydroxyethoxy)-ethoxy]-ethylaminoanthraquinone
1-2, 2, 2-trifluoroethylamino-4-β-(β-hydroxypropoxy)-ethylaminoanthraquinone
1-2, 2, 2-trifluoroethylamino-4-β-(β-hydroxypropoxy)-propylaminoanthraquinone
1-2, 2, 2-trifluoroethylamino-4-β-[β-(β-hydroxypropoxy)-propoxy]-propylaminoanthraquinone
1-2, 2, 2-trifluoroethylamino-4-γ-(γ-hydroxypropoxy)-propylaminoanthraquinone
1-2, 2, 2-trifluoroethylamino-4-γ-[γ-(γ-hydroxypropoxy)-propoxy]-propylaminoanthraquinone β-(β-hydroxyethoxy)-ethylamine, β-[β-(β-hydroxyethoxy)-ethoxy]-ethylamine, β-(β-hydroxypropoxy)-propylamine, β-[β-(β-hydroxypropoxy)-propoxy]-propylamine, γ-(γ-hydroxypropoxy)-propylamine, γ-(γ-methoxypropoxy)-propylamine, γ-(γ-ethoxypropoxy)-propylamine and β-(β-methoxypropoxy)-propylamine which are amines used in the preparation of the anthraquinone compounds of my invention can be prepared as described in my U. S. Patent 2,357,176 issued August 29, 1944. γ-[γ-(γ-hydroxypropoxy)-propoxy]-propylamine can be prepared by reacting HOCH₂CH₂CH₂—O—
CH₂CH₂CH₂—O—CH₂CH₂CH₂OH with ammonia in the presence of Raney nickel in accordance with the procedure described in my U. S. Patent 2,357,176.

While the dye compounds of my invention have been described more particularly in connection with the coloration of cellulose acetate and nylon textile materials it is to be noted that they are useful for the coloration of the other materials named herein and that they yield about the same colors on these materials as they do on cellulose acetate and nylon.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose.

The anthraquinone dye compounds of my invention may be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispersing agent unnecessary. Generally speaking, however, the use of a dispersing agent is desirable.

Direct dyeing operations can, with advantage, be conducted at temperatures of about 60–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 0.1–2% by weight of dye to material is employed although any desired proportions can be used.

Suitable dispersing agents together with the amounts that may be employed are disclosed in McNally and Dickey U. S. Patent 2,115,030, issued April 26, 1938. The process disclosed in this patent for the dyeing of cellulose acetate can be used in applying the dyes of the present invention to organic derivatives of cellulose and nylon textile materials.

In order that my invention may be entirely clear, it is here noted that the alkylamino, alkoxyalkylamino, hydroxyalkylamino and monohydroxyalkoxyalkylamino groups are conveniently introduced into the anthraquinone nucleus by means of the corresponding primary amine in accordance with the procedure described hereinbefore. To illustrate, the trimethylolmethylamino and β-hydroxyethylamino groups, for example, can be introduced by means of trimethylolmethylamine and ethanolamine, respectively.

While pyridine, n-butyl alcohol, ethyl alcohol, toluene and acetic acid have been disclosed as solvents which can be used to purify the compounds of my invention, chloroform and nitrobenzene can also be used. The purification can be effected by adding the compound to be purified to the solvent, heating to effect solution of the compound and then cooling to effect precipitation of the compound. Alternately, the compound can be added to the heated solvent. As the methods of purification are well known to those skilled in the art to which this invention is directed no further discussion is believed necessary.

I claim:

The anthraquinone compound having the formula:

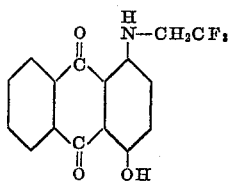

JOSEPH B. DICKEY.

REFERENCES CITED

The following references are of record in the file of this patent:

UNITED STATES PATENTS

| Number | Name | Date |
| --- | --- | --- |
| 2,085,736 | Calcott et al. | July 6, 1937 |
| 2,112,258 | Wilden | Mar. 29, 1938 |
| 2,174,182 | Schlichenmaier et al. | Sept. 26, 1939 |
| 2,333,402 | Wuertz et al. | Nov. 2, 1943 |
| 2,359,381 | Perkins et al. | Oct. 3, 1944 |

OTHER REFERENCES

Gilman, ed., "Organic Chemistry," (2nd ed., 1943), vol. I, pages 956, 960, 963.